US011567744B2

(12) United States Patent
Toper

(10) Patent No.: US 11,567,744 B2
(45) Date of Patent: Jan. 31, 2023

(54) REMOVING BRANCHING PATHS FROM A COMPUTER PROGRAM

(71) Applicant: Manycore Corporation, Walnut, CA (US)

(72) Inventor: Nicolas Toper, Paris (FR)

(73) Assignee: Manycore Corporation, Walnut, CA (US)

( * ) Notice: Subject to any disclaimer, the term of this patent is extended or adjusted under 35 U.S.C. 154(b) by 21 days.

(21) Appl. No.: 17/376,109

(22) Filed: Jul. 14, 2021

(65) Prior Publication Data

US 2022/0019416 A1 Jan. 20, 2022

Related U.S. Application Data

(60) Provisional application No. 63/051,864, filed on Jul. 14, 2020.

(51) Int. Cl.
*G06F 8/41* (2018.01)
*G06F 8/71* (2018.01)

(52) U.S. Cl.
CPC ................. *G06F 8/41* (2013.01); *G06F 8/71* (2013.01)

(58) Field of Classification Search
CPC ............ G06F 8/4442; G06F 8/41; G06F 8/71; G06F 8/443; G06F 8/433
USPC ........................................................ 717/153
See application file for complete search history.

(56) References Cited

U.S. PATENT DOCUMENTS

2019/0079771 A1* 3/2019 Jung .................. G06F 12/0875

\* cited by examiner

*Primary Examiner* — John Q Chavis
(74) *Attorney, Agent, or Firm* — Cognition IP, P.C.; Edward Steakley; Aroon Karuna

(57) ABSTRACT

Methods and systems are described for removing branches from a computer program. The system receives code for a computer program, with the code including a number of branches. Each branch is part of a branching path and includes a jump instruction. The system executes the code, and upon encountering a branching path at runtime, the system proceeds with a number of steps. First, the system computes the result of the branch, then prefetches independent instructions outside of the branch to be executed. The system then executes one or more of the prefetched independent instructions and removes an if statement within the jump instruction of the branch at the computed result of the branching path. The system then executes the jump instruction of the branch at the computed result of the branching path.

20 Claims, 7 Drawing Sheets

← 300

**Landroidx/appcompat/app/AppCompatActivity;-
>getDelegate()Landroidx/appcompat/app/AppCompatDelegate;**

iget-object v0, p0, Landroidx/appcompat/app/AppCompatActivity;- ← 302
>mDelegate:Landroidx/appcompat/app/AppCompatDelegate;

304 —   if-nez v0, :cond_0 invoke-static {p0, p0}, Landroidx/appcompat/app/AppCompatDelegate;-
>create(Landroid/app/Activity;Landroidx/appcompat/app/AppCompatCallback;)Landroidx/appc
ompat/app/AppCompatDelegate;

move-result-object v0 iput-object v0, p0, Landroidx/appcompat/app/AppCompatActivity;-
>mDelegate:Landroidx/appcompat/app/AppCompatDelegate;

:cond_0 iget-object v0, p0, Landroidx/appcompat/app/AppCompatActivity;-
>mDelegate:Landroidx/appcompat/app/AppCompatDelegate;

return-object v0

.end method

Figure 3

REMOVING BRANCHING PATHS FROM A COMPUTER PROGRAM

CROSS-REFERENCE TO RELATED APPLICATIONS

This application claims the benefit of U.S. Provisional Application No. 63/051,864, filed on Jul. 14, 2020, the contents of which are incorporated herein. This application is related to U.S. patent application Ser. No. 16/005,894 filed on Jun. 12, 2018, entitled "SYSTEMS AND METHODS FOR AUTOMATIC COMPUTER CODE PARALLELIZATION, which is incorporated herein.

FIELD OF THE INVENTION

The present invention relates generally to computer science, and more particularly, to methods and apparatuses for removing branching instructions from a computer program.

BACKGROUND

In computer processor architecture, instruction pipelining is a technique for implementing instruction-level parallelism within a single processor. Pipelining attempts to keep every part of the processor busy with some instruction by dividing incoming instructions into a series of sequential steps (i.e., the "pipeline") performed by different processor units with different parts of instructions processed in parallel. A processor is said to be "fully pipelined" if the processor can fetch an instruction on every cycle. Thus is some instructions or conditions require delays which inhibit fetching new instructions, the processor is not fully pipelined.

Modern processors are "superscalar" architectures, which means that they are capable of executing many instructions at once. For example, some processors can retire four or six instructions per cycle. Additionally, many processors can initiate instructions via "out-of-order execution" to minimize the number of wasted cycles. In out-of-order execution, a processor can start working on instructions that appear much later in program code; that is, the processor executes instructions in an order governed by the availability of input data and execution units, rather than by their original order in a program. In doing so, the processor can avoid being idle while waiting for the preceding instruction to complete and can, in the meantime, process the next instructions that are able to run immediately and independently.

One complicating factor for out-of-order superscalar execution is that most computer program code contains branches. Branches, such as if-then clauses, are instructions which can direct a computer to begin executing a different instruction sequence, and thus deviate from its default behavior for executing instructions. Such branch instructions are implemented as "jumps" wherein the processor is instructed to conditionally either execute instructions further away, or continue executing instructions on its current path. For out-of-order superscalar execution, branch instructions create branching dependency paths within a computer program, such that for a particular instance of a program in a specific state, there is a definite dependency tree for the program. There can be many different possible dependency trees based on different program states, leading to a combinatorial explosion of paths (i.e., valid instruction sequences the processor could follow) as multiple branches are traversed. The number of branching paths, in turn, leads to memory fetch and blocked instructions, and thus major stalls in execution.

Sophisticated branch predictors have been built to help cope with this combinatorial explosion. Branch predictors allow for the prefetching of data to prevent stalls in execution. Upon encountering a branch (and thus a jump instruction), branch predictors attempt to predict which path will be taken. Branch predictors often work quite well, particularly when the branch is easy to predict. For example, it is often safe for the processor to predict that a loop will continue forever, as the processor will therefore only mispredict one branch per loop. However, if a branch is difficult to predict, the program execution becomes very slow. This is because the cost of the mispredicted branches is exponential, i.e., it impacts the pipeline, ability to prefetch data, and other aspects of the processor. While branch predictors work very well in certain contexts and certain computer programs, when they do not, removing branches from a computer program (and thus the need for branch prediction as well) would allow the rest of the CPU to operate faster and more efficiently. However, branches are not deterministic and it is thought that they cannot be predicted statically, so implementation of branch removal has proven to be a significant challenge.

Thus, there is a need in the field of computer science to create a new and useful system and method for removing branching instructions from a computer program to provide major speed optimizations to processors performing execution of the program. The source of the problem, as discovered by the inventors, is a lack of ability to deterministically predict substitutions for branch instructions.

SUMMARY

One embodiment relates to providing for a system and method for removing branching paths from a computer program. The system receives code for a computer program. The code includes a number of branches which are part of branching paths in the code, with each branch having a jump instruction. The system executes the code, and upon encountering a branching path at runtime, the system performs the following: first, the system computes the result of the branching path. The system then prefetches, from within the code, a number of independent instructions outside of the branch to be executed, wherein the prefetching occurs until a processor prefetch window is filled; and executes one or more of the prefetched independent instructions. The system then removes an if statement within the jump instruction of the branch. Finally, the system executes the jump instruction of the branch at the computed result of the branching path.

In some embodiments, the system identifies all function calls within the computer program code, and generates a versioned dependency graph (VDG) for each identified function call, including a number of code blocks to be compiled. The VDG represents a dependency path for the code blocks based on a plurality of dependents for the dynamic instruction.

In some embodiments, prior to executing the code, the system compiles the code, including rewriting the code to optimize at least a subset of the branches. In some embodiments, during compile time, the system rewrites the code to add a plurality of independent instructions outside of the branch to be executed at that point in the code. In some embodiments, during compile time and for each code block to be compiled, the system locates a number of additional code blocks which are closest neighbors of the code block, and inserts, at that point in the code, a number of additional code blocks to be executed at that point in the code. In some embodiments, at compile time, the system adds a jump rewriter segment to the code to remove an if statement within the jump instruction of the branch.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3 is a diagram illustrating one example embodiment 300 of executing bytecode for a computer program, in accordance with some embodiments.

DETAILED DESCRIPTION

Figure 1A:
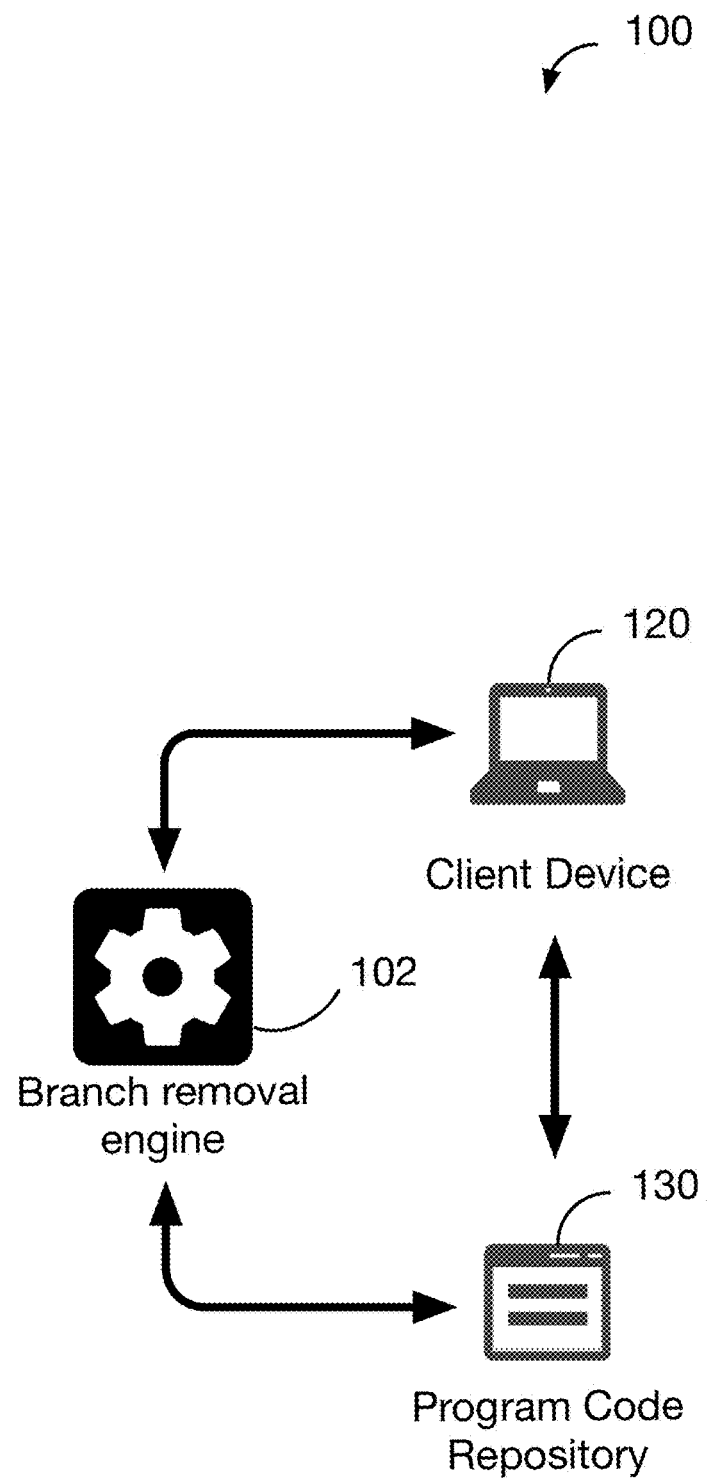
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a client device 120 is connected to a branch removal engine 102. The branch removal engine 102 and client device 120 are each connected to program code repository 130. In some embodiments, the client device in this environment may be a computer, or one or more processing components of a computer. In some embodiments, the client device is configured to host the branch removal engine and compile and execute computer program code. In some embodiments, the branch removal engine is hosted on a remote server, and the client device 120 connects to the branch removal engine 102 via a communications network.

The exemplary environment 100 is illustrated with only one client device and branch removal engine for simplicity, though in practice there may be more or fewer client devices and/or branch removal engines. In some embodiments, the client device and branch removal engine may be part of the same computer or device.

In an embodiment, the branch removal engine 102 may perform the method 200 or other method herein and, as a result, provide removal of branching paths within program code from the program code repository 130. In some embodiments, this may be accomplished via communication with the client device 120 or other device(s) over a network between the client device 120 or other device(s) and an application server or some other network server. In some embodiments, the branch removal engine 102 is an application hosted on a computer or similar device, or is itself a computer or similar device configured to host an application to perform some of the methods and embodiments herein.

Client device 120 is a device that sends and receives information to the branch removal engine 102. In some embodiments, client device 120 is a computing device capable of hosting and executing one or more applications or other programs capable of sending and receiving information. In some embodiments, the client device 120 may be a computer desktop or laptop, mobile phone, virtual reality or augmented reality device, wearable, or any other suitable device capable of sending and receiving information. In some embodiments, the branch removal engine 102 may be hosted in whole or in part as an application executed on the client device 120. In some embodiment, the client device is a processor, e.g., central processing unit ("CPU"), or one or more processing components of a computer.

Program code repository 130 functions to store and/or maintain computer program code which is optimized by the branch removal engine 102, The optional program code repository may also store and/or maintain any other suitable information for the branch removal engine 102 to perform elements of the methods and systems herein. In some embodiments, the program code repository is a local or remote database which can be queried by one or more components of system 100 (e.g., by the branch removal engine 102), and specific stored data in the database(s) can be retrieved.

Figure 1B:
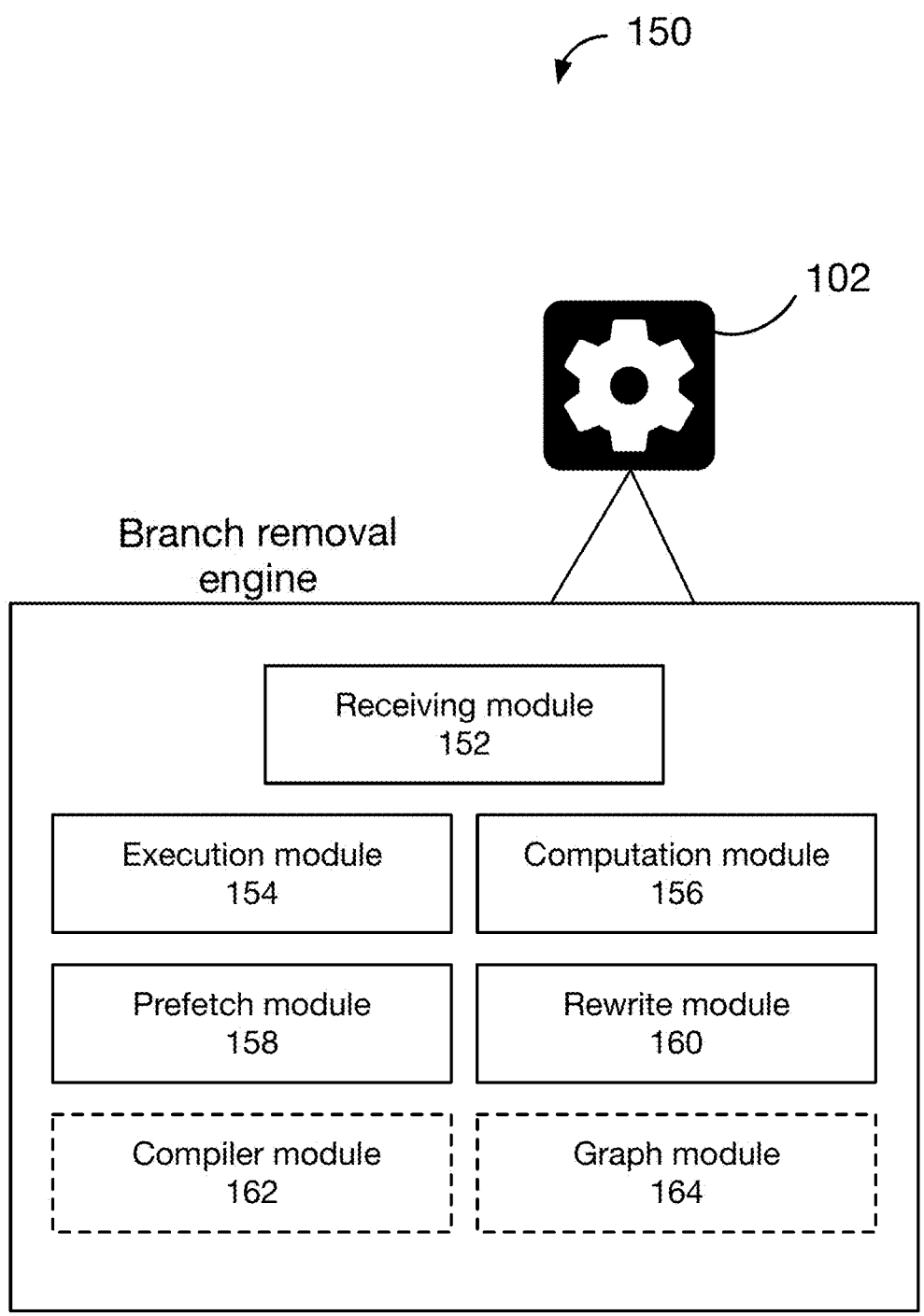
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module 152 functions to receive a computer program consisting of code. In some embodiments, the computer program consists of code received from the client device 120 or some other device or system. In some embodiments, the code is bytecode, such as Dalvik (i.e., bytecode which Android applications are compiled into), Java bytecode which is compiled to be interpreted by a Java Virtual Machine ("JVM"), or any other suitable bytecode. In some embodiments, the code is written in a programming language which is capable of being compiled into bytecode, such as, e.g., Python or Java. In some embodiments, the code may be machine code. In some other embodiments, the code may be source code or intermediary code, such as, e.g., LLVM IR.

Execution module 154 functions to execute the code. In some embodiments, execution module 154 executes the code by interpreting the code at runtime. In some embodiments, the execution occurs on a computing machine or a virtual machine ("VM").

Computation module 156 functions to compute the result or outcome of branching paths. This computational process will be described in further detail below.

Prefetch module 158 functions to prefetch, from within the code, a number of independent instructions outside of the branch to be executed, wherein the prefetching occurs until a processor prefetch window is filled. In some embodiments, the prefetch module also executes one or more of the prefetched independent functions. This prefetch process will be described in further detail below.

In some embodiments, rewrite module 160 functions to rewrite or otherwise update the computer program code such that one or more basic coding blocks are inserted, removed, or modified within the code. In some embodiments, the rewrite module 160 functions at compile time. In some embodiments, the rewrite module 160 functions at runtime via self-modifying code or some other means.

Compiler module 162 functions to compile the computer program code. In some embodiments, the compiler is a static-compilation-based compiler or machine capable of compiling code and approximating execution of the corresponding computer program. In some embodiments, the compiler module 162 sends this compiled computer program on to one or more systems or devices, or presents it within a user interface of a client device. In some embodiments, cloud compilation is performed. Because compilation can take a significant amount of compute time, such compilation can potentially be much faster using techniques such as parallelism.

Graph module 164 functions to generate one or more graphs or other data to be used by the system to perform the systems and methods herein. In some embodiments, graph module 164 generates versioned dependency graphs (VDGs), dependency trees, or otherwise determines dependency data within the program code.

The above modules and their functions will be described in further detail in relation to an exemplary method below.

II. Exemplary Method

Figure 2A:
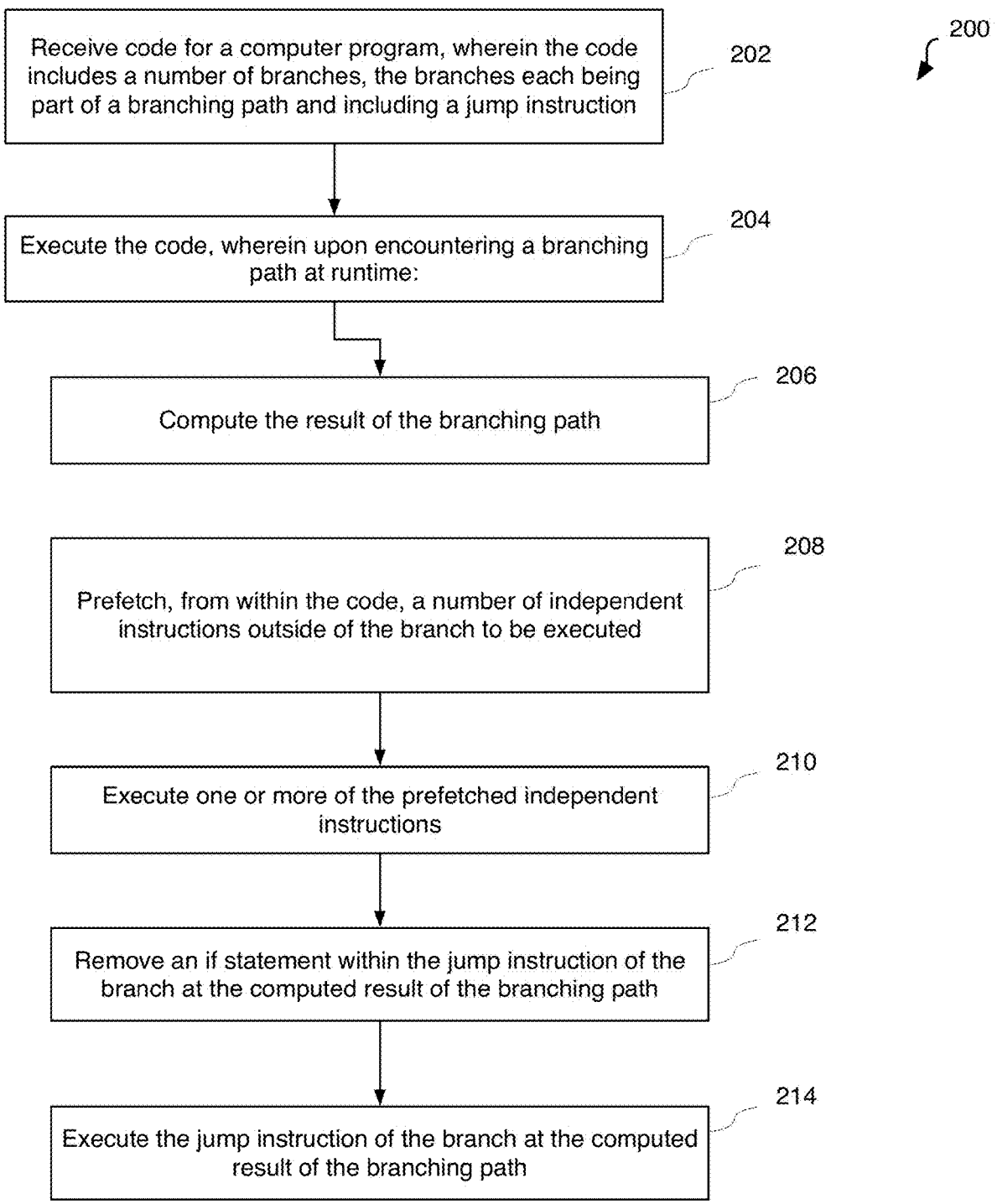
FIG. 2A is a flow chart illustrating an exemplary method that may be performed in some embodiments.

FIG. 2A is a flow chart illustrating an exemplary method that may be performed in some embodiments.

At step 202, the system receives code for a computer program. The code includes a number of branches, the branches each being part of a branching path and including a jump instruction. In some embodiments, the code is bytecode or machine code. In some embodiments, a client device 120 sends a computer program in code form to one or more devices or systems configured to receive the computer program. In some embodiments, a user selects the computer program based on a prompt or request for the computer program within a user interface of the client device. In some embodiments, the client device 120 or branch removal engine 102 requests the program code from program code repository 130. In some embodiments, upon selecting the code, the code is sent to the branch removal engine 102, which may be part of the client device 120 or part of some other device or system.

The received code includes a number of branches, with each branch being a part of a branching path and including a jump instruction. In some embodiments, the branch includes both a predicate (e.g., an "if" instruction) and a jump instruction (e.g., a "goto" instruction). In some embodiments, the branching path includes two conditional branches. In some embodiments, the branching path can contain more than two conditional branches.

At step 204, the system executes the code. In some embodiments, the execution is performed by a virtual machine, interpreter, or some other system capable of executing and evaluating code at runtime. The following steps 206, 208, 210, 212, 214, and 216 are performed at runtime upon encountering a branching path.

At step 206, during runtime, the system computes the result of the branching path that was encountered. The computation includes executing the conditional "if" test in the branching path to determine the result of the condition. For example, if the "if" test is "if-nez v0, :cond_0", then computing the result involves evaluating the "if-nez v0" portion, i.e., determining if v0 is nonzero.

At step 208, the system prefetches, from within the code, a number of independent instructions outside of the branch to be executed. In some embodiments, prefetching is a speedup technique used by a computer processor to fetch instructions from code before they are needed within the code. In some embodiments, the prefetched instructions are stored in a queue or similar data structure, such as a prefetch input queue (PIQ). In some embodiments, operations (e.g., "ops" or "micro-ops") are fetched in advance in order to increase the speedup and overall efficiency of the processor executing the code. In some embodiments, this prefetching occurs until a processor prefetch window (e.g., a prefetch limit, prefetch buffer, or similar) is filled. For example, a processor prefetch window may be filled at 200 micro-ops.

In some embodiments, an instruction or operation is considered to be "independent" in this context if there are no dependencies shared between the instructions and the branches of the branching path being computed. Dependencies can include, e.g., shared function calls, static variables, and instance variables. In some embodiments, the identification of independent instructions involves, prior to prefetching, generating one or more graphs such as a Versioned Dependency Graph ("VDG") or dependency trees to identify the dependency relationships for basic coding blocks within the program. In some embodiments, this generation is performed at compile time. In some other embodiments, this generation is executed at run time. In some embodiments, when loading registers as part of the generation of the VCG or dependency trees, one aim is to minimize the number of load operations while maximizing throughput.

At step 210, the system executes one or more of the prefetched independent instructions.

At step 212, upon the result of the branching path being obtained from step 206, the system removes an "if" statement or similar conditional statement within the jump instruction of the branch at the computed result of the branching path. For example, if the instruction is "if-nez v0, :cond_0", then the system removes the "if" portion of the instruction so that it reads "goto :cond_0", i.e., jump to cond_0.

At step 214, the system executes the jump instruction of the branch at the computed result of the branching path. At this point, the system executes the jump instruction which no longer is associated with an "if" statement or similar conditional statement. As such, the system is able to traverse this portion of code without any conditional branching. The system continues back at step 204, executing the code. Upon encountering a new branching path, the system again performs step 206 for the new branching path, and so on until the program execution reaches a stopping point (e.g., termination or end of the program).

Figure 2B:
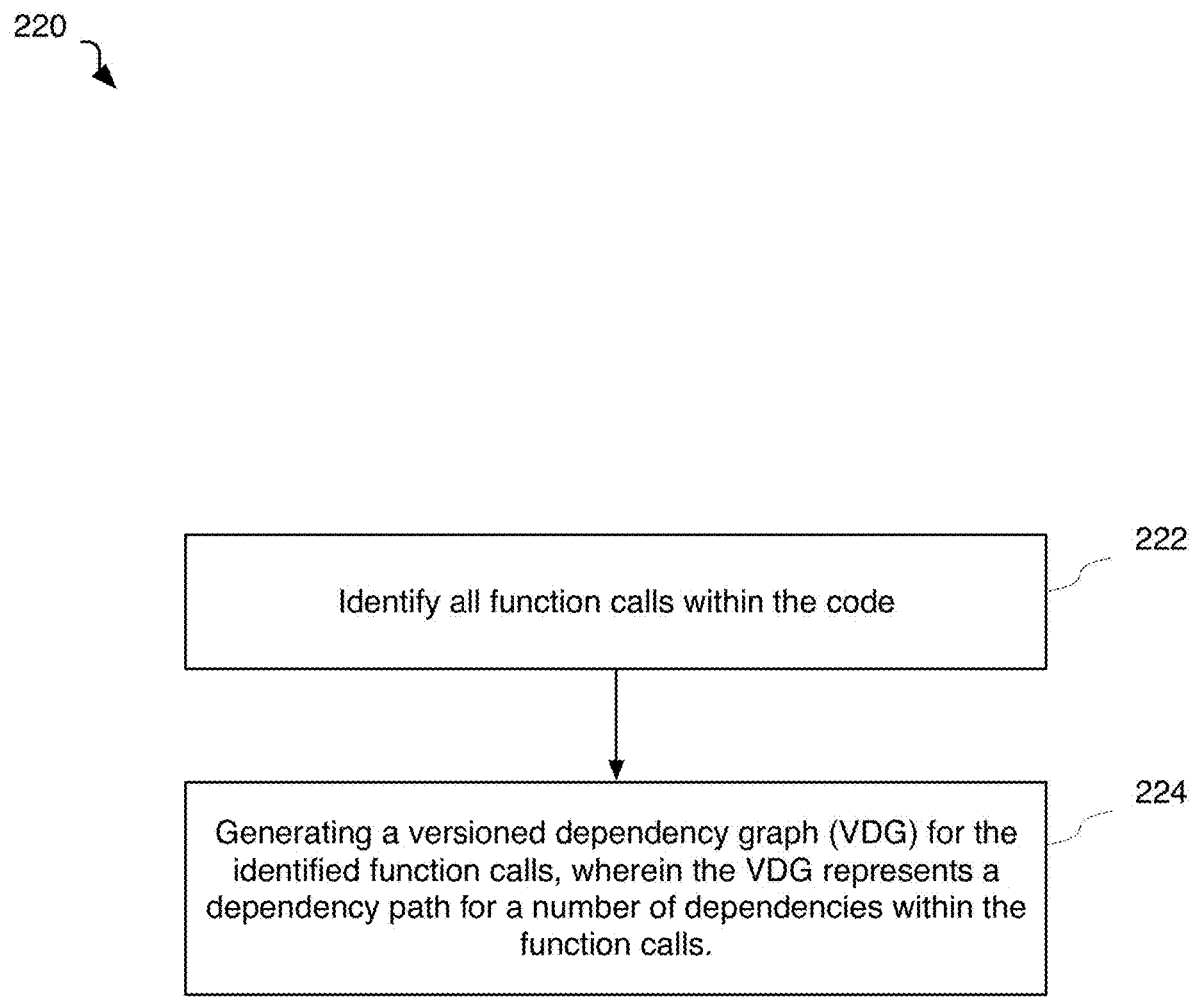
FIG. 2B is a flow chart illustrating additional steps that may be performed in accordance with some embodiments.
Figure 2C:
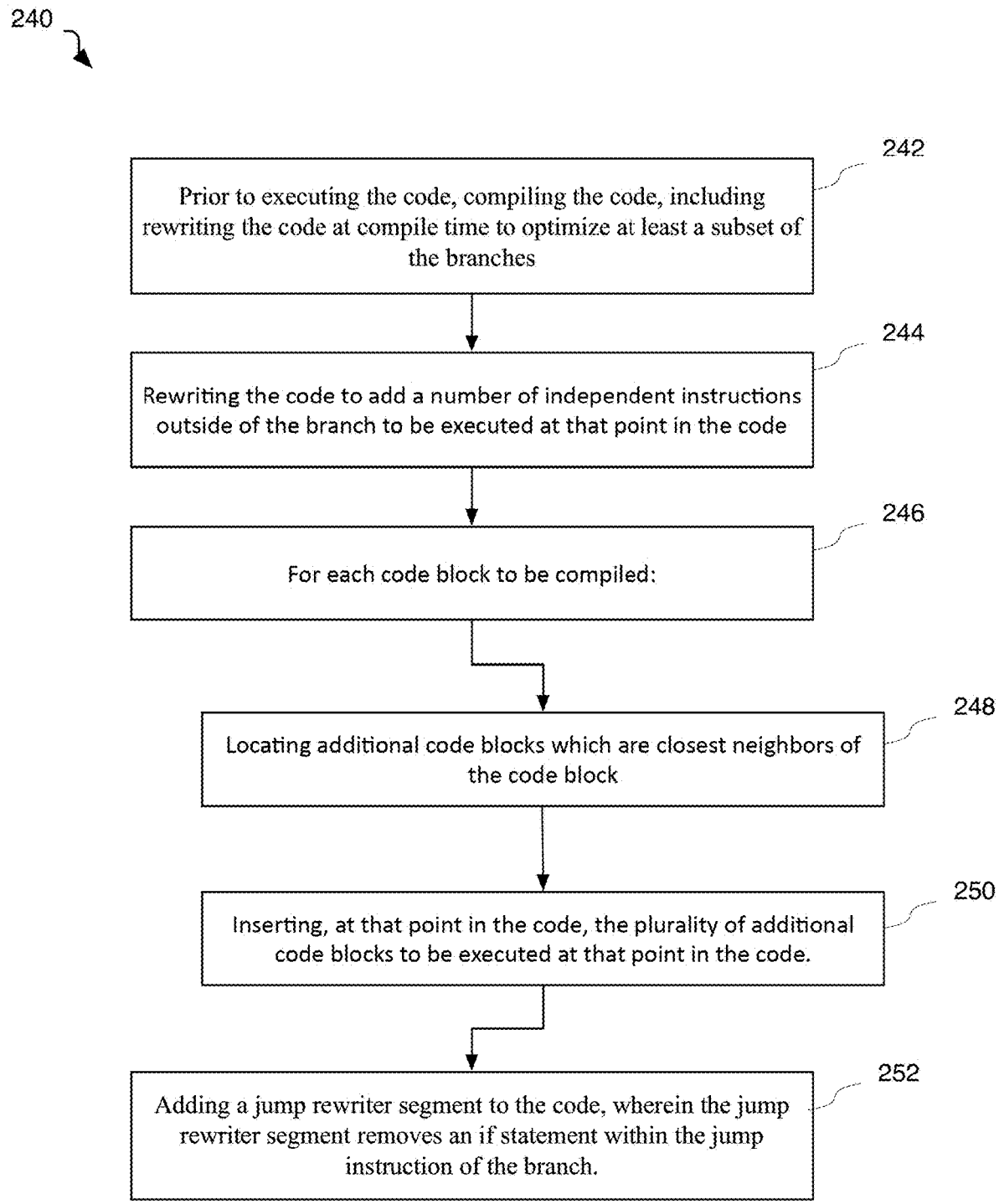
FIG. 2C is a flow chart illustrating additional steps that may be performed in accordance with some embodiments.

FIG. 2B is a flow chart illustrating an exemplary method 220, wherein additional optional steps may be performed in accordance with some embodiments. In some embodiments of the exemplary method 220, the illustrated steps are performed prior to executing the code. In some embodiments, the illustrated steps are performed prior to any compilation of the code. In some embodiments, the illustrated steps are performed during compile time or during runtime.

At step 222, the system identifies all function calls within the code. In some embodiments, the system identifies function calls based on one or more predefined criteria. In some embodiments, the system identifies function calls by parsing based on the programming language. In varying embodiments, the system identifies all function calls within a basic coding block or set of basic coding blocks, a branch or set of branches, a branching path or set of branching paths, or some other segmentation of the code.

At step 224, the system generates a versioned dependency graph (VDG) for the identified function calls, wherein the VDG represents all possible dependency paths for a piece of data within the function call. The VDG maps dependency relationships between disparate code instructions (e.g., distinct functions, methods, operations, etc.) of the program code. The VDG, once constructed, can function for various uses within the systems and methods herein to identify instructions or sets of instructions that are independent. In some embodiments, this can include instructions which are required to wait for the completion of the instructions moved to a thread. In some embodiments, generating the VDG is a step which must be performed before building out one or more threads to executing one or more code sections independently from other code sections of the program, based on a threading strategy derived from using the VDG. In some embodiments, the VDG is used to identify which instructions are to be identified as "independent instructions" within, e.g., step 210 of the method in FIG. 2A.

In some embodiments, the VDG may be generated in real time or substantially real time during compile time or run time, thus enabling the VDG to reveal in real time or substantially real time threading and out-of-order execution opportunities within the code of the program. In some embodiments, the VDG may be specifically embedded within the processor component(s) (e.g., a CPU) of a device implementing the methods herein. In some embodiments, the system described may be fully built in a hardware device implementing the methods herein.

FIG. 2B is a flow chart illustrating an exemplary method 240, wherein additional optional steps may be performed in accordance with some embodiments. Exemplary method 240 includes a number of optional steps in which the code is compiled prior to being executed.

At step 242, prior to executing the code, the system compiles the code. In some embodiments, compiling the code includes rewriting the code at compile time to optimize at least a subset of the branches.

At step 244, the system rewrites the code to add a number of independent instructions outside of the branch to be executed at that point in the code. In some embodiments, the system identifies the independent instructions based on a versioned dependency graph (VDG), as described above with respect to FIG. 2B. Step 244 is similar to step 210 of FIG. 2A, with the difference being that the program code is rewritten at compile time to add the independent instructions at that point in the code, rather that the system prefetching independent instructions at runtime.

At step 246, the following steps 248 and 250 are performed for each basic coding block to be compiled.

At step 248, for each code block to be compiled, the system locates independent coding blocks. In some embodiments, the additional coding blocks are closest neighbors of the code block (i.e., K-nearest neighbors). In some embodiments, the system locates closest neighbors of the code block by storing all available code blocks within the code up to that point, and then classifying additional code blocks based on a similarity measure. In some embodiments, the similarity measure pertains to register load. The closest neighbors to the code block are code blocks which have the least amount of register load or unload at that point in the code. In many (but not necessarily all) cases, the closest neighbors to a code block will be other code blocks within the same function. In some embodiments, the system locates additional coding blocks based on weighing or determining, on balance, whether the program is in a state where it is possible to run this portion of the code, and what the cost would be to run this portion of the code, including, i.e., the cost associated with loading and storing of the registers. In some embodiments, locating additional independent code blocks is performed based on a generated VDG. In some embodiments, locating additional code blocks is performed by splitting the register space in two, in order to execute another code block faster.

At step 250, for each code block to be compiled, the system inserts, at that point in the code, the plurality of additional code blocks to be executed at that point in the code. The insertion involves rewriting the code at compile time.

At step 252, the system adds a jump rewriter segment to the code. In some embodiments, the jump rewriter segment removes an "if" statement within the jump instruction of the branch. In some embodiments, step 252 is similar to step 214 of FIG. 2A, with the difference being that the jump rewriter segment rewrites the code at compile time, rather than the system removing the "if" statement within the jump instruction at runtime.

FIG. 3 is a diagram illustrating one example embodiment 300 of executing bytecode for a computer program, in accordance with some embodiments. Example embodiment 300 illustrates an example excerpt from a computer program in bytecode. In this example, the bytecode is in Dalvik and executed via a Dalvik Virtual Machine ("Dalvik VM"). The example shows a single function being executed at runtime within the computer program. At 302, an "iget-object v0, p0, . . . " instruction is given at runtime. This instruction reads an object reference instance field into v0. The instance is referenced by p0. Thus, the instruction is to look into p0 to grab the value of object v0. At 304, an "if-nez v0, :cond_0" instruction is given. This instruction checks to see if v0 is nonzero. If it is, then a jump instruction to :cond_0 is given. However, the pipeline in this instance would not fully be able to predict the value of v0 correctly. To avoid a misprediction, the system will execute the "if" test and compute the result of the branching path. In the meantime, so as not to waste cycles, the system may execute a number of independent instructions elsewhere in the computer program concurrently while the result of the branching path is being computed. For example, the system may execute an applyDayNight( ) function elsewhere in the computer program if it determines (via a VDG or other way of determining dependencies) that applyDayNight( ) is completely independent from this function.

Figure 4:
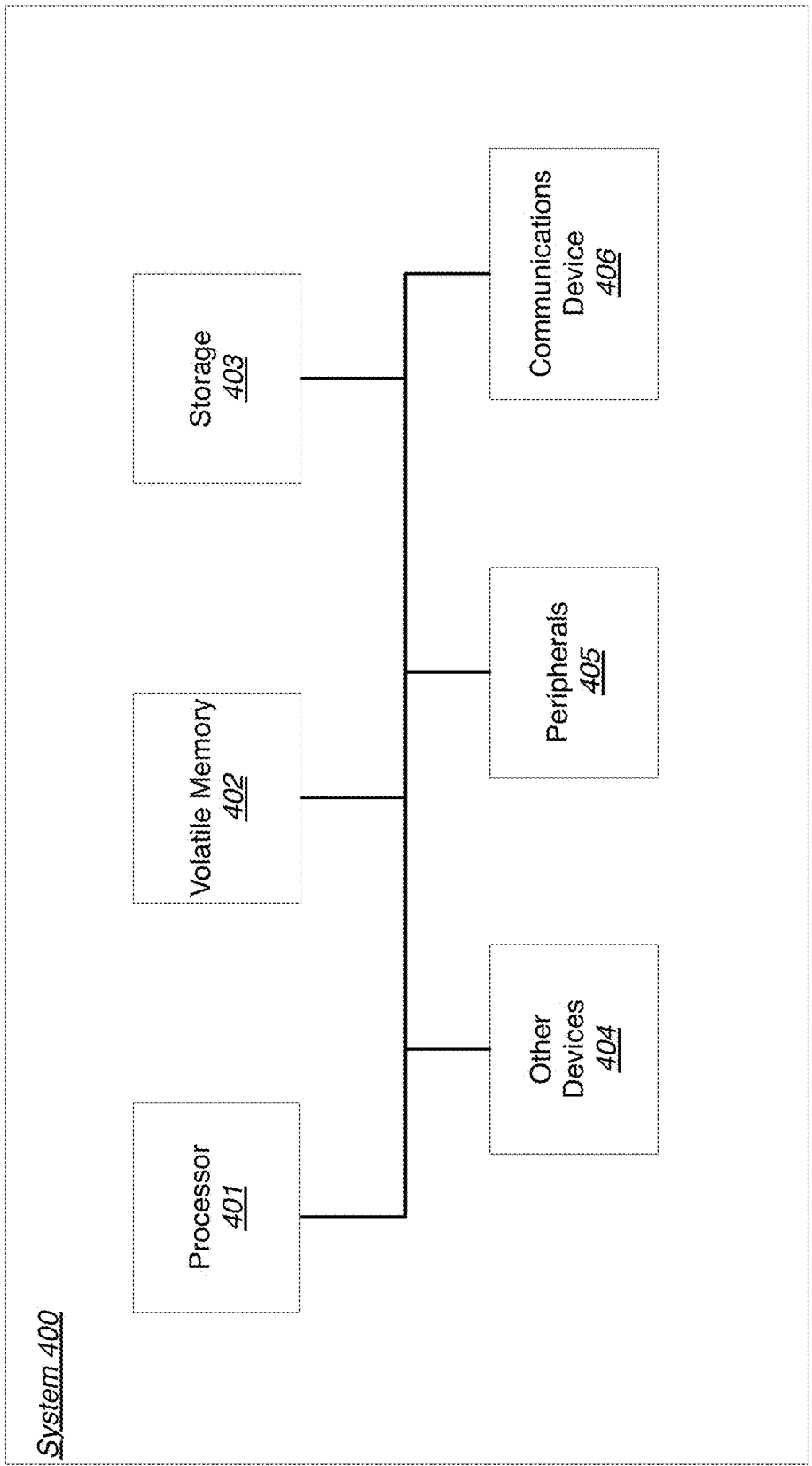
FIG. 4 is a diagram illustrating an exemplary computer that may perform processing in some embodiments.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions to implement functionality corresponding to the components of a device to perform the disclosure herein. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. It should also be understood that while most computer systems work with registers, some architectures do not require or include them (for instance, pure stack architecture). Regardless, the systems and methods presented herein will function via computer systems with or without registers, and will function for any system capable of loading programs or code which supports branching (which may, e.g., not always constitute code).

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for removing branches from a computer program, comprising:
   receiving code for a computer program, wherein the code comprises a plurality of branches, the branches each being part of a branching path and comprising a jump instruction; and
   executing the code, wherein upon encountering a branching path at runtime, the method further comprises:
   computing the result of the branch;
   prefetching, from within the code, a plurality of independent instructions outside of the branch to be executed;
   executing one or more of the prefetched independent instructions;
   removing an if statement within the jump instruction of the branch at the computed result of the branching path; and
   executing the jump instruction of the branch at the computed result of the branching path.

2. The method of claim 1, further comprising:
   generating a versioned dependency graph (VDG) for each branching path, wherein the VDG represents a dependency path for a plurality of dependencies within the branching path.

3. The method of claim 1, further comprising:
   prior to executing the code, compiling the code, wherein compiling the code comprises rewriting the code at compile time to optimize at least a subset of the plurality of branches.

4. The method of claim 3, wherein upon encountering a branch at compile time, the method further comprises:
   rewriting the code to add a plurality of independent instructions outside of the branch to be executed at that point in the code.

5. The method of claim 3, wherein upon encountering a branch at compile time, the method further comprises:
   for each code block to be compiled:
   locating a plurality of additional code blocks that are capable of being executed, and
   inserting, at that point in the code, the plurality of additional code blocks to be executed at that point in the code.

6. The method of claim 5, wherein the located plurality of additional code blocks have the least register loads of all available code blocks in the code.

7. The method of claim 5, wherein locating the plurality of additional code blocks that are capable of being executed comprises locating a plurality of independent code blocks based on a generated VDG for each branching path.

8. The method of claim 3, wherein upon encountering a branch at compile time, the method further comprises:
   adding a jump rewriter segment to the code, wherein the jump rewriter segment removes an if statement within the jump instruction of the branch.

9. The method of claim 1, wherein upon encountering a branch at runtime, the method further comprises:
   prefetching, from within the code, a plurality of unrelated instructions outside of the branch to be executed, wherein the prefetching occurs until a processor prefetch window is filled, and
   executing one or more of the prefetched unrelated instructions.

10. The method of claim 8, wherein the processor prefetch window utilizes an adaptive cache.

11. The method of claim 1, wherein removing the if statement within the jump instruction of the branch at the computed result of the branching path comprises:
    executing self-modifying code at runtime to remove the if statement within the jump instruction.

12. The method of claim 1, wherein the code is executed via a hardware chip.

13. A non-transitory computer-readable medium containing instructions for removing branching paths from a computer program, comprising:
    instructions for receiving code for a computer program, wherein the code comprises a plurality of branches, the branches each being part of a branching path and comprising a jump instruction; and
    instructions for executing the code, wherein upon encountering a branching path at runtime, the method further comprises:
    instructions for computing the result of the branching path;
    instructions for prefetching, from within the code, a plurality of independent instructions outside of the branch to be executed, and
    instructions for executing one or more of the prefetched independent instructions;
    instructions for removing an if statement within the jump instruction of the branch at the computed result of the branching path; and instructions for executing the jump instruction of the branch at the computed result of the branching path.

14. The non-transitory computer-readable medium of claim 13, further comprising:
instructions for identifying all function calls within the computer program code; and
instructions for generating a versioned dependency graph (VDG) for each identified function call comprising a plurality of code blocks to be compiled, wherein the VDG represents a dependency path for the code blocks based on a plurality of dependencies for the dynamic instruction.

15. The non-transitory computer-readable medium of claim 13, further comprising:
prior to executing the code, instructions for compiling the code, wherein compiling the code comprises rewriting the code at compile time to optimize at least a subset of the plurality of branches.

16. The non-transitory computer-readable medium of claim 15, wherein upon encountering a branch at compile time, the method further comprises:
instructions for rewriting the code to add a plurality of independent instructions outside of the branch to be executed at that point in the code.

17. The non-transitory computer-readable medium of claim 15, wherein upon encountering a branch at compile time, the method further comprises:
for each code block to be compiled:
instructions for locating a plurality of additional code blocks which are closest neighbors of the code block, and
instructions for inserting, at that point in the code, the plurality of additional code blocks to be executed at that point in the code.

18. The non-transitory computer-readable medium of claim 17, wherein the located plurality of additional code blocks have the least register load of all available code blocks in the code.

19. The non-transitory computer-readable medium of claim 15, wherein upon encountering a branch at compile time, the method further comprises:
instructions for adding a jump rewriter segment to the code, wherein the jump rewriter segment removes an if statement within the jump instruction of the branch.

20. The non-transitory computer-readable medium of claim 13, wherein upon encountering a branch at runtime, the method further comprises:
instructions for prefetching, from within the code, a plurality of unrelated instructions outside of the branch to be executed, wherein the prefetching occurs until a processor prefetch window is filled, and
instructions for executing one or more of the prefetched unrelated instructions.

* * * * *